(12) United States Patent
deBuhr et al.

(10) Patent No.: US 8,371,820 B2
(45) Date of Patent: Feb. 12, 2013

(54) PANELING OF A NACELLE OF A WIND ENERGY INSTALLATION

(75) Inventors: Ingo deBuhr, Leer (DE); Martin Lehnhoff, Rendsburg (DE)

(73) Assignee: AREVA Wing GmbH, Bremerhaven (DE)

( * ) Notice: Subject to any disclaimer, the term of this patent is extended or adjusted under 35 U.S.C. 154(b) by 28 days.

(21) Appl. No.: 12/911,977

(22) Filed: Oct. 26, 2010

(65) Prior Publication Data

US 2011/0097202 A1 Apr. 28, 2011

Related U.S. Application Data

(63) Continuation of application No. PCT/EP2008/003528, filed on Apr. 30, 2008.

(51) Int. Cl.
*F03D 11/00* (2006.01)
*F03D 11/04* (2006.01)

(52) U.S. Cl. .................................... 416/244 R

(58) Field of Classification Search ............... 220/345.1; 415/4.3, 4.5, 201, 244 R, 908; 416/DIG. 6, 416/244 R
See application file for complete search history.

(56) References Cited

U.S. PATENT DOCUMENTS

| | | | |
|---|---|---|---|
| 4,757,211 A * | 7/1988 | Kristensen | 290/55 |
| 6,304,002 B1 * | 10/2001 | Dehlsen et al. | 290/1 C |
| 7,431,567 B1 * | 10/2008 | Bevington et al. | 416/244 R |
| 2003/0075915 A1 * | 4/2003 | Kim | 280/838 |
| 2007/0273154 A1 * | 11/2007 | Pedersen | 290/44 |
| 2008/0166231 A1 * | 7/2008 | Bagepalli | 415/215.1 |
| 2008/0272604 A1 * | 11/2008 | Versteegh | 290/55 |

\* cited by examiner

*Primary Examiner* — Christopher Verdier
(74) *Attorney, Agent, or Firm* — Andrew Wilford

(57) ABSTRACT

A paneling (30) of a nacelle (12) of a wind energy installation (10), in which an upturned panel ceiling (40) is provided in installation position, is created with a hatch opening (46), that is provided in the panel ceiling (40). The hatch opening (46) is advantageously provided so large, that components of the entire area of a drive train (24) of the wind energy installation (10) can be removed upwards, or inserted from above into the nacelle (12) through the hatch opening (46). Furthermore, such a hatch opening (46) is choosingly closable by means of a hatch cover (44).

8 Claims, 8 Drawing Sheets

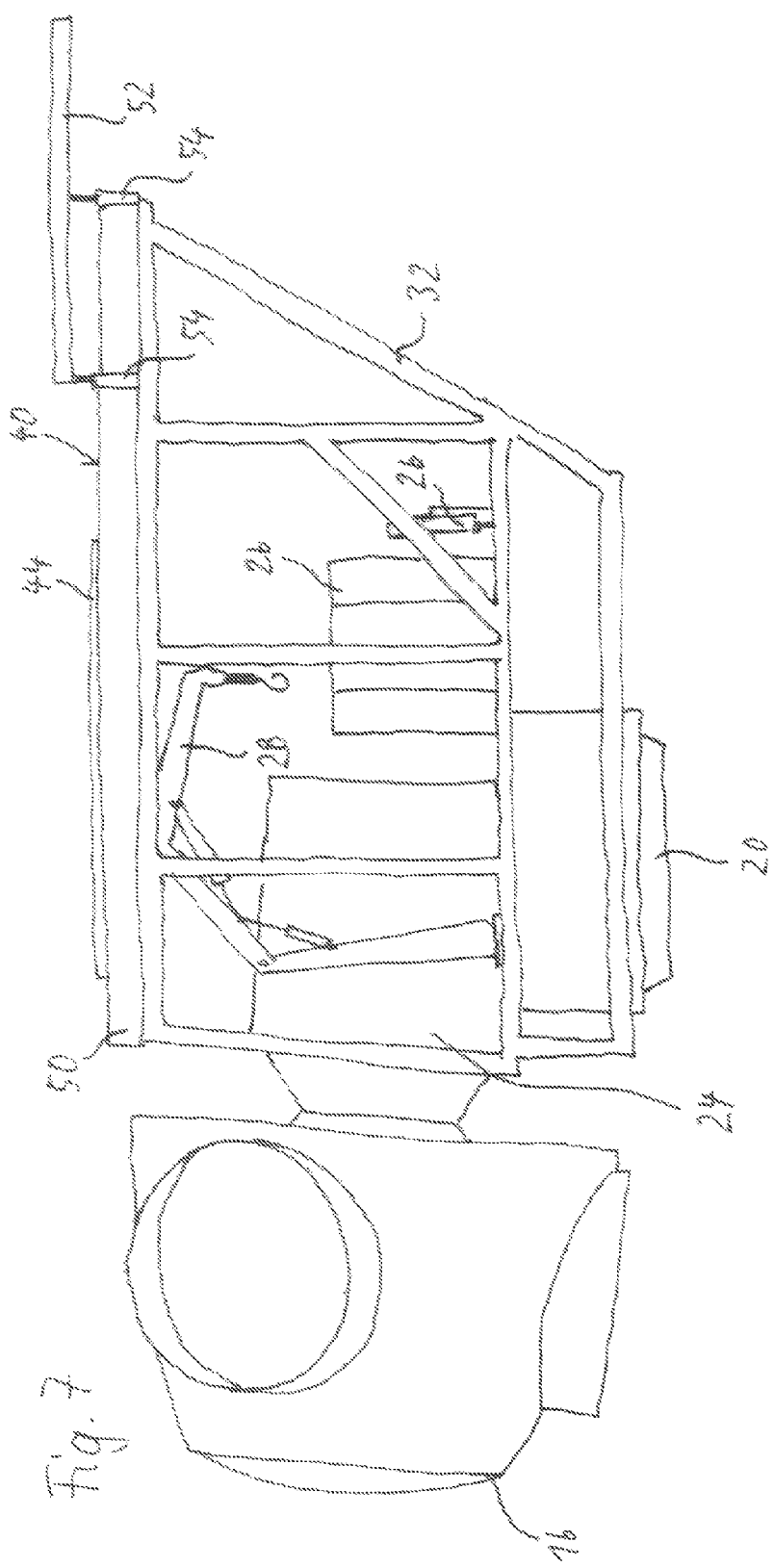

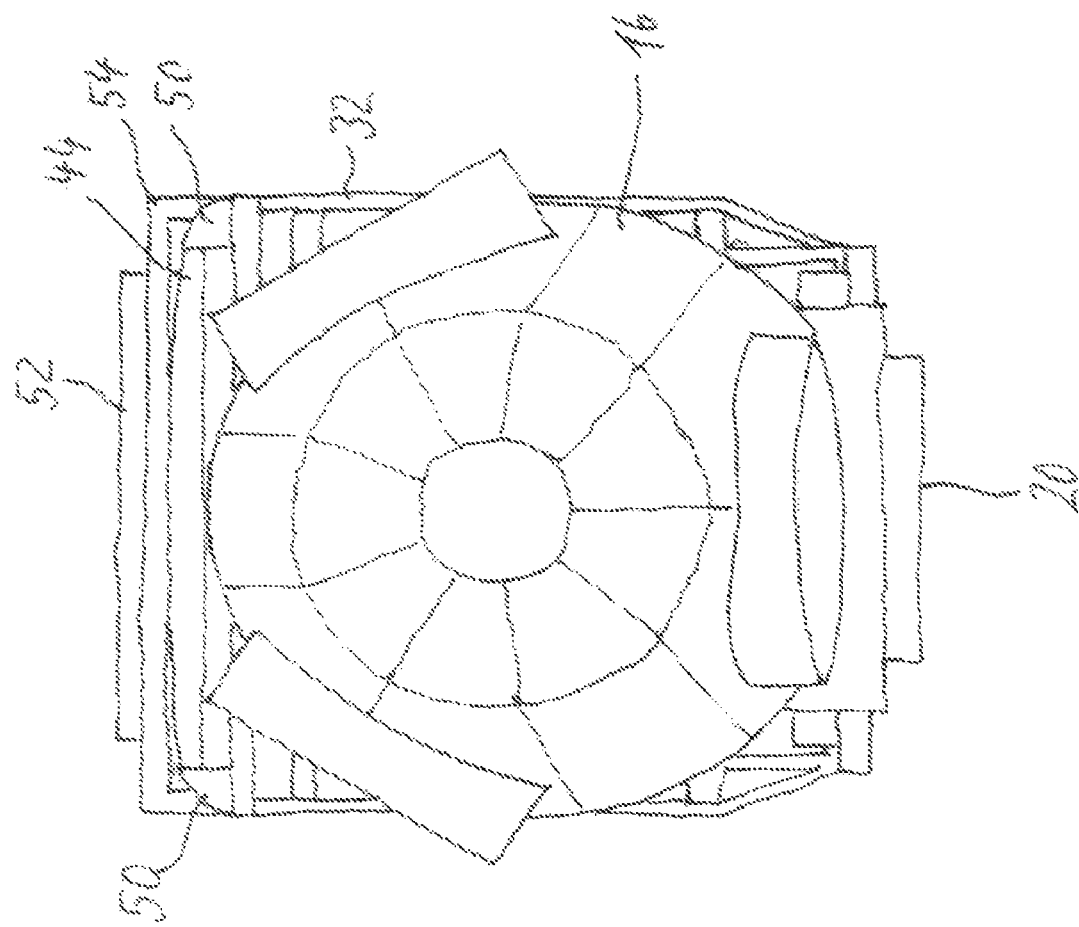

PANELING OF A NACELLE OF A WIND ENERGY INSTALLATION

CROSS-REFERENCE TO RELATED APPLICATION

This application is a continuation of PCT application PCT/EP2008/003528, filed Apr. 30, 2008, and published as WO/2009/132671 on Nov. 5, 2009.

FIELD

The invention relates to the paneling of a nacelle of a wind energy installation as well as a wind energy installation with such a paneling.

BACKGROUND

In modern wind energy installations a nacelle, on which a rotor of the wind energy installation is supported, is rotatably arranged on an associated tower. Thereby, the rotor is coupled with a drive train, but at least with a generator or another energy converter substantially arranged inside the paneling of the nacelle. The energy converter includes control systems also inside the paneling of the nacelle.

As such nacelles are to be arranged on the associated tower at high altitudes, the components, which are situated in the paneling, also have to be arranged and maintained up there. To carry out these installation and maintenance operations in a cost-effective and at the same time safe way is a great challenge.

OBJECT OF THE INVENTION

The object underlying the invention is to create a wind energy installation, wherein components to be arranged inside a paneling of an associated nacelle, can be installed and also maintained over the entire service life of the wind energy installation in a very cost-effective and at the same time safe way for the persons involved.

SUMMARY OF THE INVENTION

The object is attained according to the invention by a paneling of a nacelle of a wind energy installation in which in the installation position of the nacelle an upturned ceiling panel is provided. In the ceiling panel a hatch opening is formed or provided, which is formed or made so large, that components of the whole area of a drive train of the wind energy installation can be removed upward, or inserted from above into the nacelle through the hatch opening. Furthermore, the hatch opening is choosingly closable by a hatch cover.

With regard to installing and maintaining components of a nacelle of a wind energy installation, the solution according to the invention is effected in a totally new way, as the components do not have to be hauled up from the bottom into the nacelle by a crane as in the case of conventional wind energy installations, but the components are inserted into the nacelle and also removed from it from above. This is preferably done from the air by a helicopter. The paneling of the nacelle of a wind energy installation according to the invention is in particular especially adapted, so that it can be approached by a helicopter, and thereafter, from the helicopter components can be inserted into the paneling of the nacelle but they can also be removed from there (in case of maintenance works).

Therefore, according to the invention, a particularly large hatch opening is provided on the upturned ceiling panel of the paneling of the wind energy installation, which can substantially be opened so wide, that it bridges or spans a large part of the ceiling panel. Such an insertion of components, especially by a helicopter, is not possible with conventional (small-area) maintenance hatches, as they may also be partly provided on the upturned ceiling panel of wind energy installations at present.

In known hatches on panelings of nacelles of a wind energy installation, generally the associated hatch covers can be flipped open, this means, they are arranged in a pivotable manner. In case of an advantageous improvement of the paneling or rather the wind energy installation according to the invention, the hatch cover is, however, slidable supported or beared. Therefore, this slidable bearing is especially advantageous because the hatch cover, according to the invention, is very extensive. With regard to the area exposed to wind during opening the hatch cover, the movable bearing is very advantageous. Furthermore, such a movable hatch cover is better fixed, when a helicopter approaches the nacelle.

It is also advantageous for safe opening and closing of the hatch cover according to the invention during harsh weather conditions, if this hatch cover is arranged and slidable on the outer face of the ceiling panel. Thereby, the hatch cover advantageously overlaps with the edge of the hatch opening, so that even during storms no rain or snow can force its way into the interior of the paneling.

In case of another advantageous arrangement of the solution according to the invention, the hatch cover is about half the size of the ceiling panel, this means, it spans about half of the ceiling panel. With such a hatch cover, an optimal compromise between a coverable hatch opening, which is as large as possible, and at the same time a safe guidance and arrangement of the hatch cover during opening is created. The opened hatch cover is safely arranged on the residual half of the ceiling panel and only provides a small area exposed to wind there.

Another very advantageous use of the openable hatch cover according to the invention is further created by the fact, that on two side edges of the ceiling panel, which are arranged opposite each other, one rail per side edge is provided, on which in each case the hatch cover is slidable supported or beared.

Furthermore, a part of the ceiling panel is advantageously spanned with a passable platform, under which the hatch cover can be moved for opening the hatch opening. People can advantageously step on the platform, especially when components have to be inserted or removed from the nacelle by a helicopter through the hatch opening. At the same time the hatch cover between the passable platform and the ceiling panel is fixed safely when opened.

In case of another advantageous embodiment of the solution according to the invention, the hatch opening in the ceiling panel, which can be closed by the hatch cover, substantially covers the entire width of the associated nacelle. It is also very advantageous, when the hatch opening in the ceiling panel, which can be closed by the hatch cover, substantially reaches a front panel of the paneling, which faces an associated rotor. Such a big hatch opening at the upturned ceiling panel makes it possible to remove vertically upward or insert components of the entire area of a drive train and also over a slew ring or rotation bearing of a nacelle.

The solution according to the invention further covers a wind energy installation with such a paneling arranged in accordance with the invention.

BRIEF DESCRIPTION OF THE DRAWINGS

The invention can be best understood by those having ordinary skill in the art by reference to the following detailed description when considered in conjunction with the accompanying drawings in which an example of the invention is explained in more detail by the accompanied schematic drawings, in which

FIG. 7 is a side view like FIG. 6.

FIG. 8 is a front view like FIG. 6.

DETAILED DESCRIPTION

Figure 1:
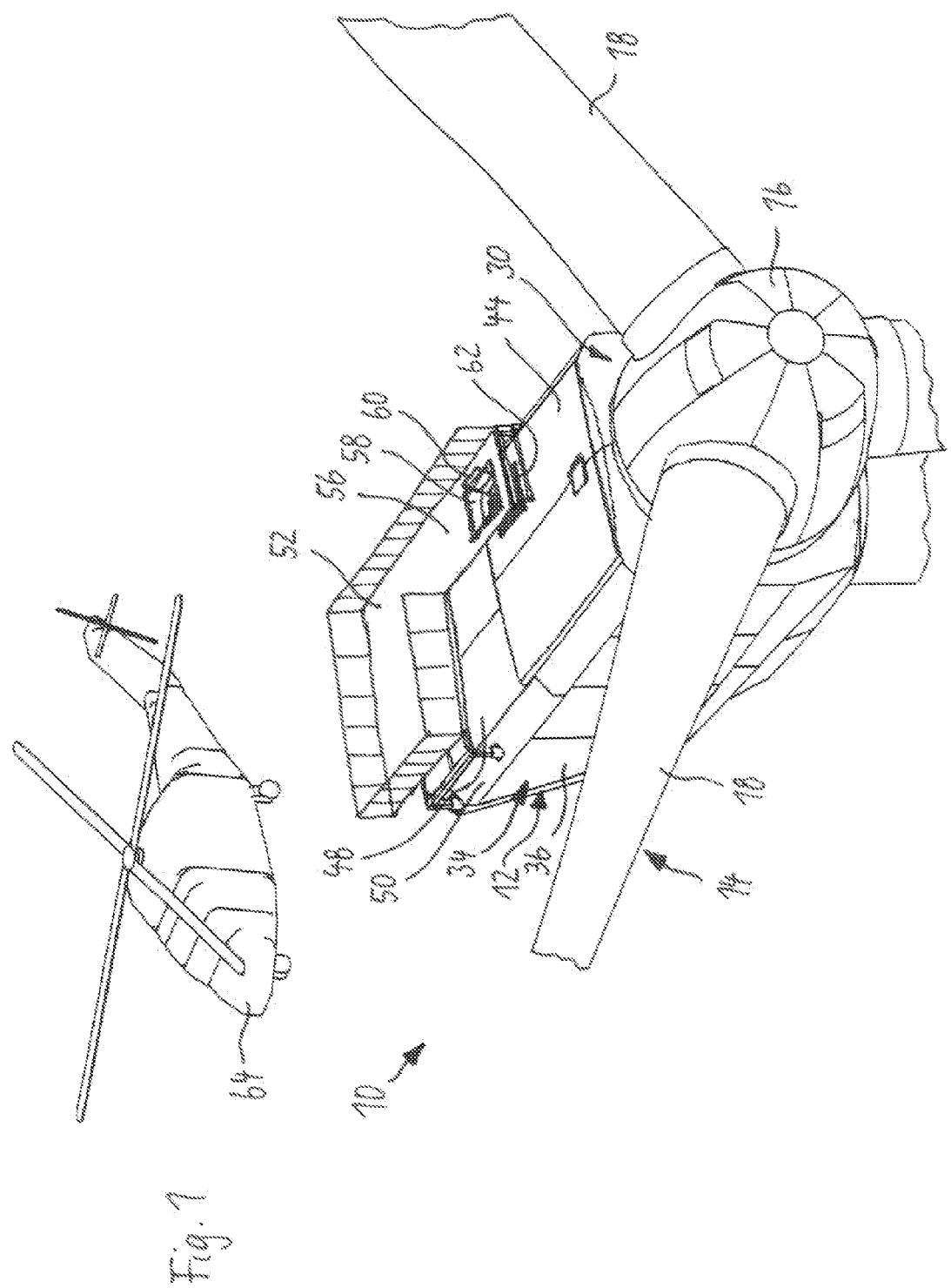
FIG. 1 is a perspective view of an example of a wind energy installation according to the invention.
Figure 2:
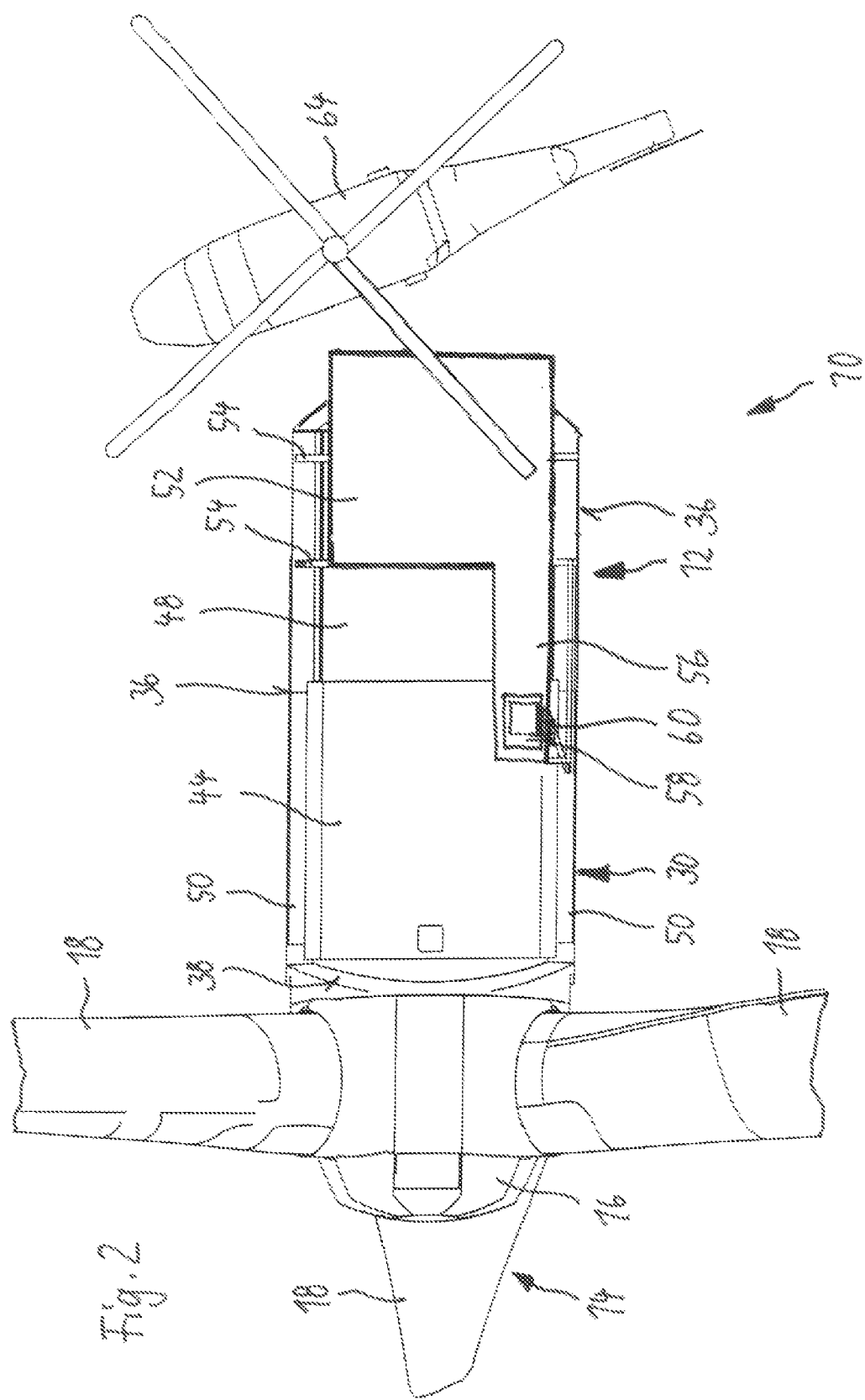
FIG. 2 is a top view of the wind energy installation according to FIG. 1.

Reference will now be made in detail to the presently preferred embodiments of the invention, examples of which are illustrated in the accompanying drawings. Throughout the following detailed description, the same reference numerals refer to the same elements in all figures.

In the figures a wind energy installation 10, which includes a nacelle 12 as an essential component, is shown. At the nacelle 12, a rotor 14 is pivoted by a hub 16 from which three rotor blades 18 project radially of the hub.

Figure 3:
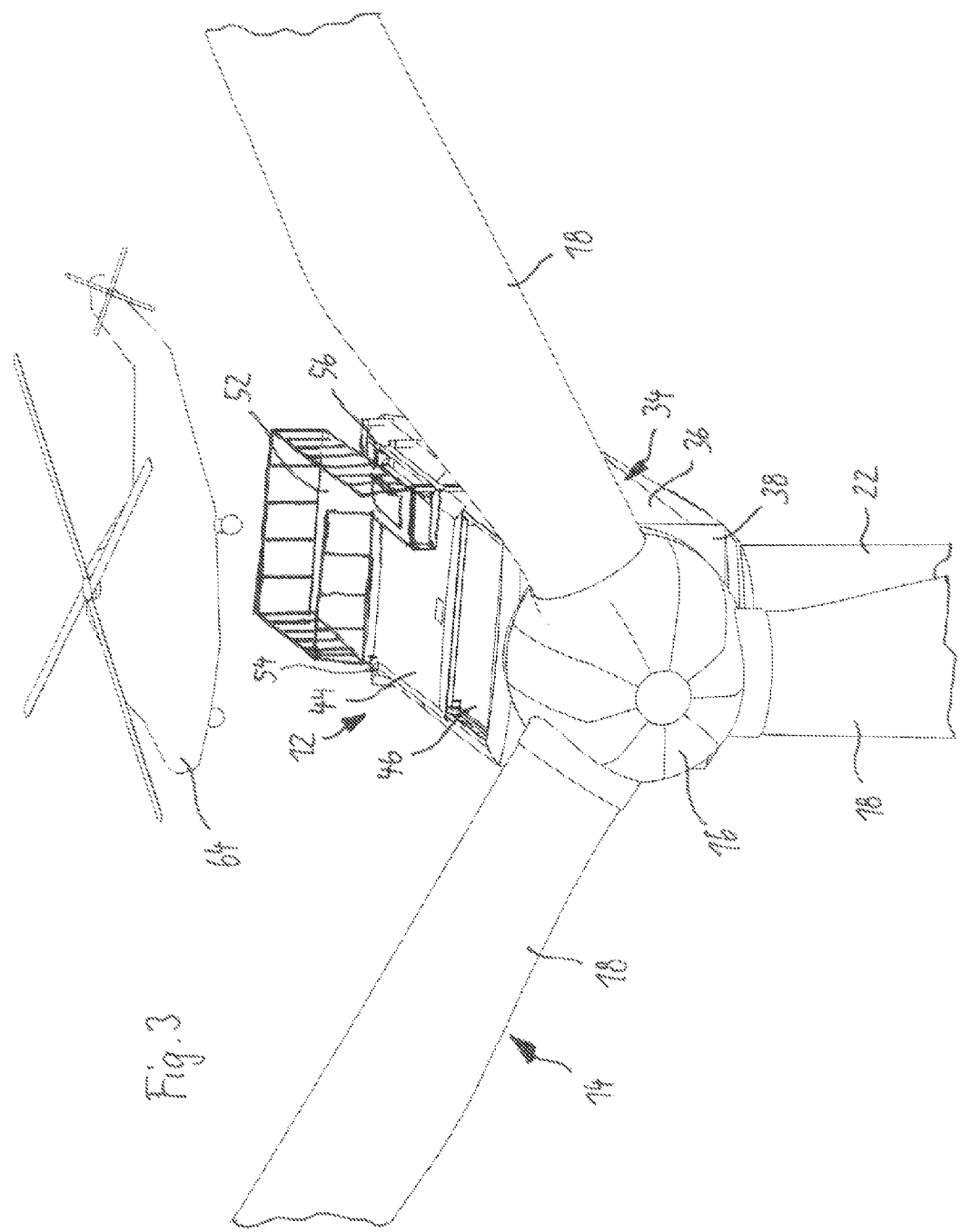
FIG. 3 is a perspective view of the wind energy installation according to FIG. 1 with the hatch partly opened.
Figure 4:
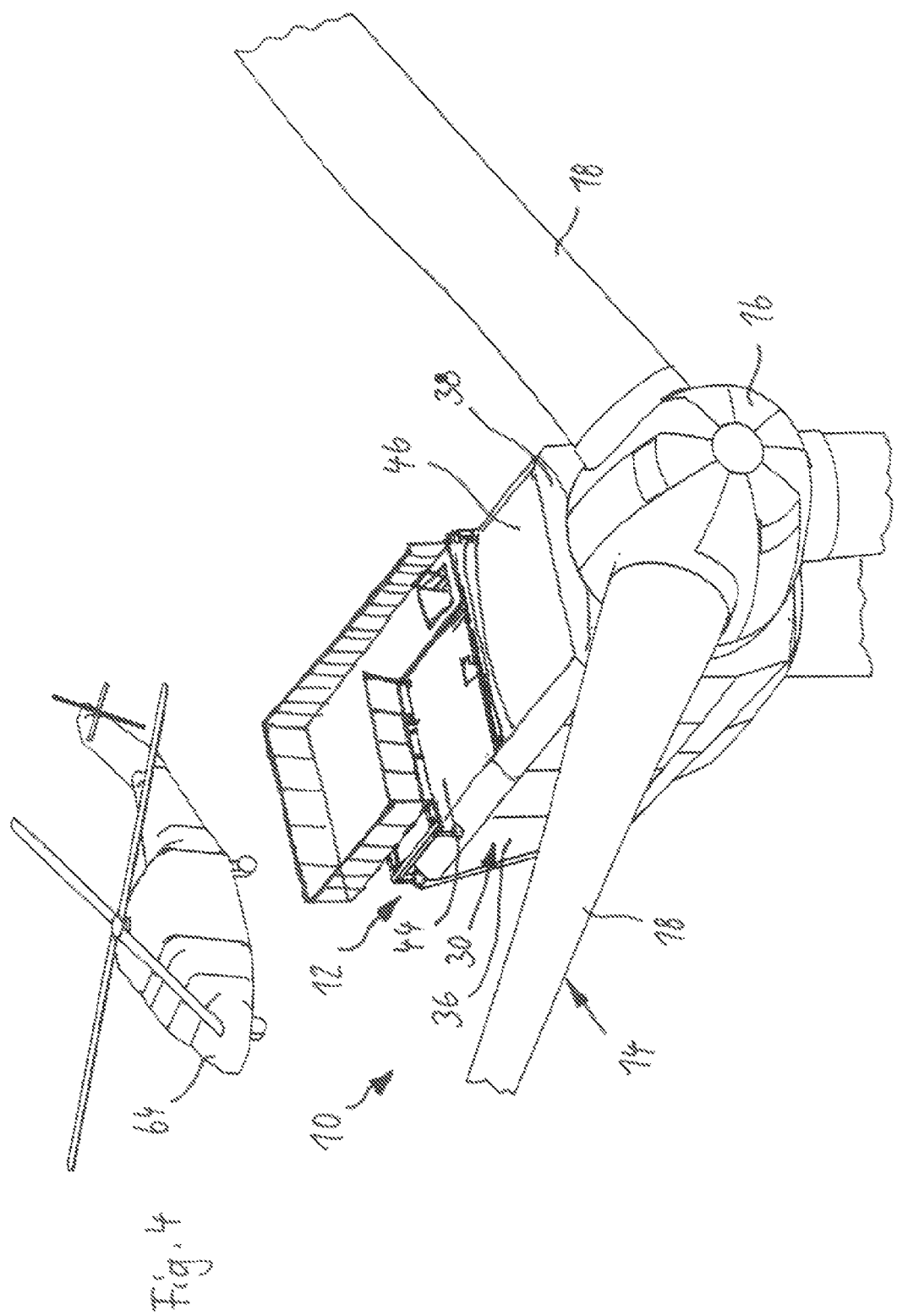
FIG. 4 is a view like FIG. 1 with the hatch completely opened.

The nacelle 12 is arranged on a tower 22 (only shown in FIG. 3) by a slew ring 20 and contains a drive train with a generator 24 as well as associated control systems 26 inside. Furthermore, the nacelle 12 carries a crane 28 by which especially components of the drive train can be inserted and exchanged.

The exterior shell of the nacelle 12 is provided with a paneling 30, which is built of a frame 32 and panels 34 disposed on it. These panels 34 include two lateral panels 36, a front panel 38 and a ceiling panel 40.

On the ceiling panel 40 between its lateral margins 42, which are arranged opposite each other, a hatch cover 44 is provided which substantially spans the entire width of the ceiling panel 40 and covers an underlying hatch opening 46. The hatch opening 46 substantially extends over the entire width of the ceiling panel 40 and in a longitudinal direction from the front panel 38 to a ceiling panel 48, whereby the hatch opening 46 substantially makes up one half of the longitudinal extension and the ceiling panel 48 extends over the second rear half of the ceiling panel 40.

Thereby, the hatch cover 44 is situated relative to the ceiling panel 48 in such a way that it can be slid over it. Thereby, the hatch cover 44 is guided on two rails 50, which are respectively situated on the lateral margins 42 of the ceiling panel 40. In this way the hatch cover 44 also seals the hatch opening 46 safely during harsh weather conditions and can be slid at the same time in a very simple way into an open position, in which it then only exposes a very small area to wind.

Above the ceiling panel 48 there is a helicopter roping area in the form of a platform 52 supported with some clearance above the ceiling panel 48 by two beams 54. Thereby, both beams 54 extend from one lateral margin 42 of the ceiling panel 40 to the opposite lateral margin 42. The beams 54 and the platform 52 are provided in such a way, that the hatch cover 44 can be slid over the ceiling panel 48 and under the platform 52. The platform 52 is provided in a way, that persons can step and walk on it, with a bridge 56 that extends along one of the lateral margins 42 in the direction of the rotor blades 18 and, therefore, extends over the hatch opening 46.

The bridge 56 has an opening 58 in which a ladder 60 is situated. The ladder 60 allows a person to get from the platform 52 or rather the bridge 56 into the interior of the nacelle 12 and back. The person can use the ladder 60 when the hatch cover 44 is slid away from the hatch opening 46. Furthermore, the person can also use the ladder 60 when the hatch cover 44 closes the hatch opening 46. This is possible because the hatch cover 44 has a closable opening 62 under the bridge opening 58 when the hatch cover 44 is closed.

Figure 5:
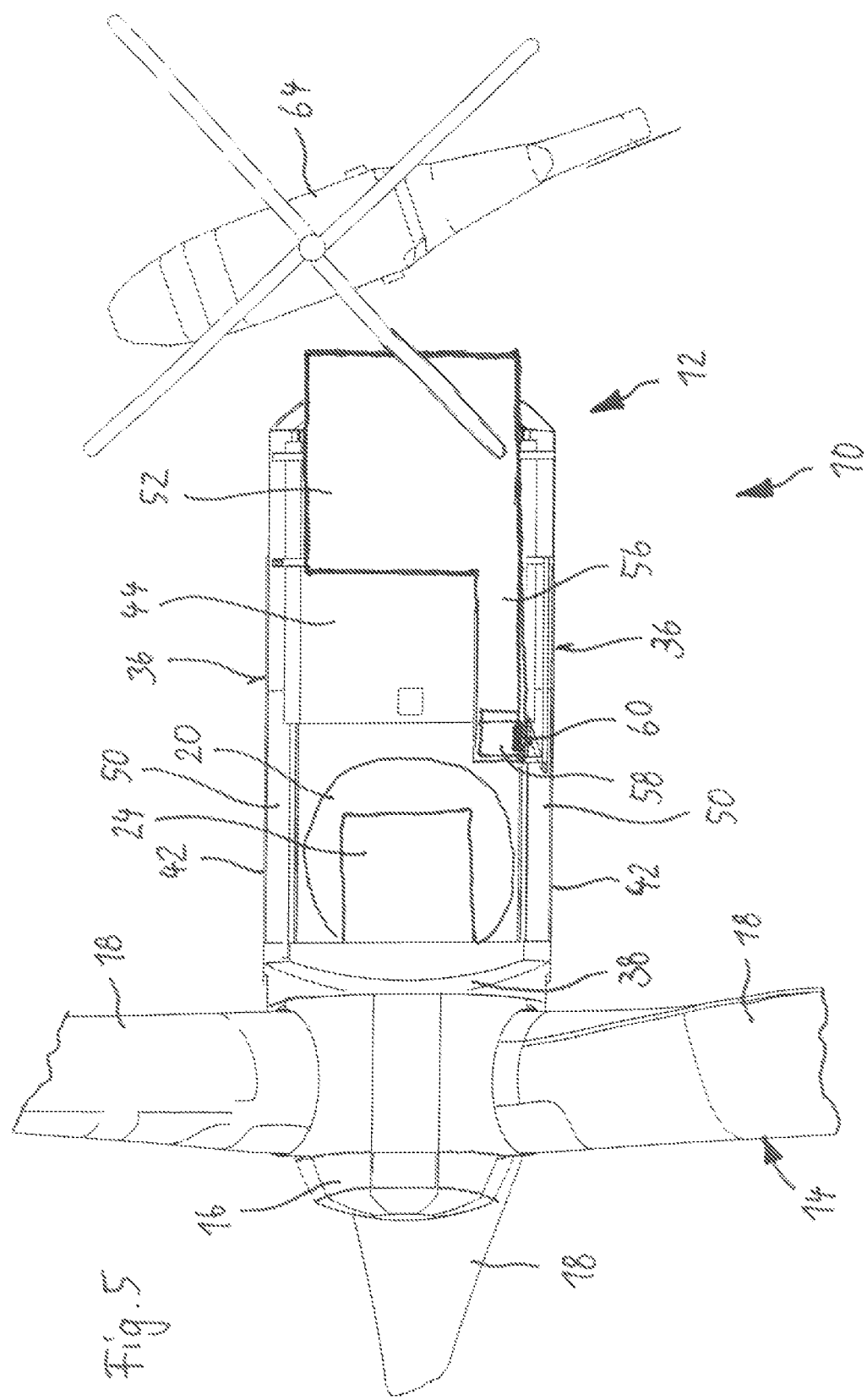
FIG. 5 is a view like FIG. 2 with the hatch completely opened.
Figure 6:
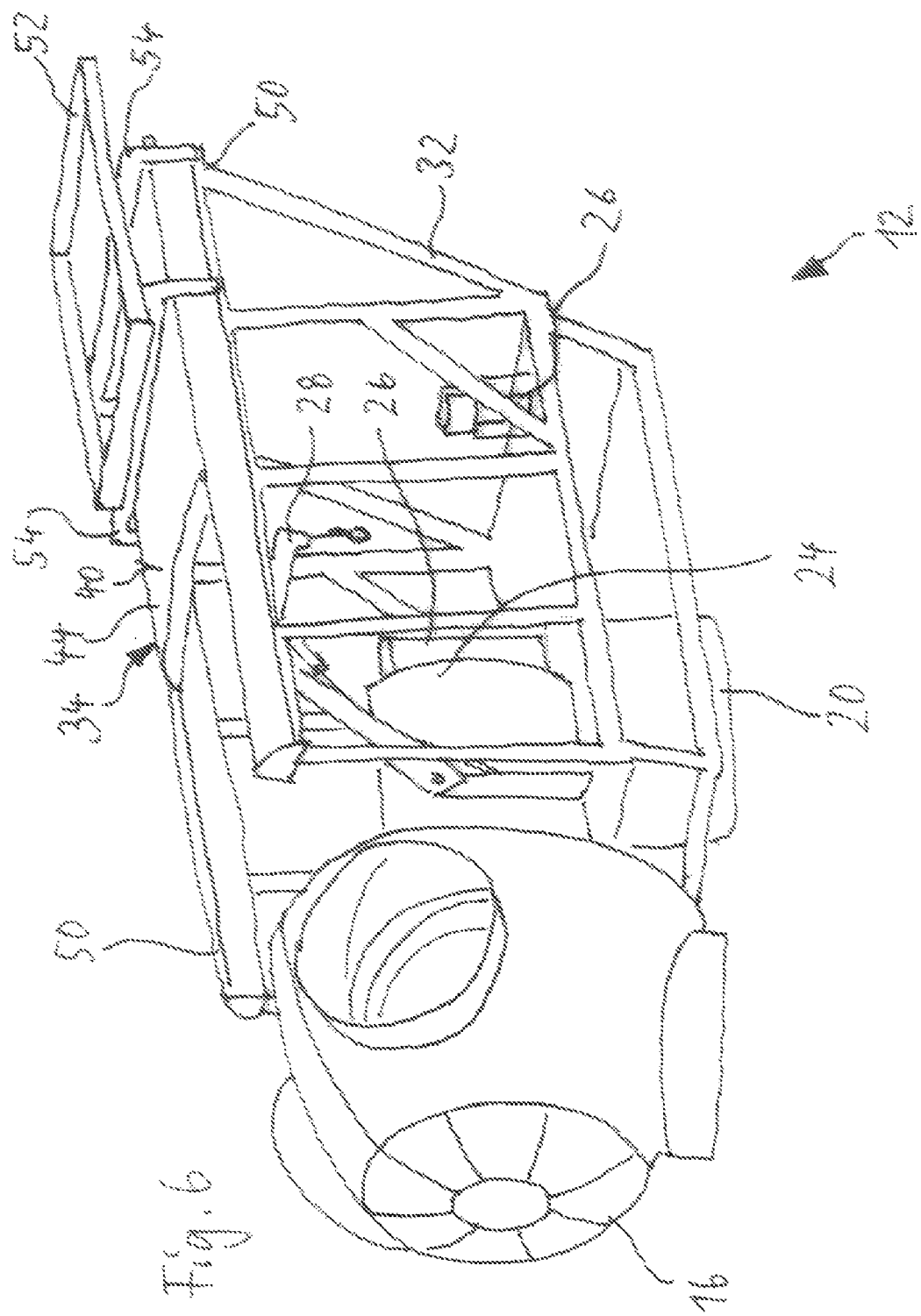
FIG. 6 is a perspective view of the wind energy installation according to FIG. 1 with partly demounted components.

When the hatch cover 44 is opened, the hatch opening 46 is so large that components can be removed vertically upward from the interior of the nacelle 12 as well as inserted from above into the nacelle 12. This is preferably done by a helicopter 64. Therefore, the hatch opening 46 is advantageously made so large, that it extends over the entire area of the drive train (see FIG. 5).

Finally, it should be noted that all features, which are described in the application documents should individually or in any combination receive independent protection.

Equivalent elements can be substituted for the ones described above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. Paneling of a nacelle of a wind energy installation, the paneling comprising:
    a ceiling panel;
    a hatch opening formed in the ceiling panel, the hatch opening being large enough as to accommodate components of the entire area of a drive train of the wind energy installation being removed upward or inserted from the top into the nacelle through the hatch opening;
    a bridge platform on the ceiling panel intended to support service personnel and offset from the hatch opening and;
    a hatch cover shiftable between a closed position covering the hatch opening and an open position offset from the hatch opening directly underneath the bridge platform.

2. The paneling according to claim 1, wherein the hatch cover is slidable between the open and closed positions.

3. The paneling according to claim 2, wherein the hatch cover is slidable on the outside of the ceiling panel.

4. The paneling according to claim 1, wherein the hatch cover spans about half of the ceiling panel.

5. The paneling according to claim 2, wherein the ceiling panel has two opposite lateral margins each carrying a respective rail, the hatch cover is slidable on the rails.

6. The paneling according to claim 1, wherein the hatch opening in the ceiling panel extends substantially across the entire width of the nacelle.

7. The paneling according to claim 1, wherein the hatch opening in the ceiling panel extends a front panel of the paneling that faces a rotor.

8. A method of installation of components of a wind energy installation, the method comprising the steps of:

providing a paneling of a nacelle of the wind energy installation a ceiling panel forming an upwardly open hatch opening large enough as to accommodate components of drive train of the wind energy installation for removal upward or insertion from above downward into the nacelle through the hatch opening, the paneling including a bridge platform above the nacelle, intended to support service personnel, and horizontally offset from the hatch opening;

sliding a hatch cover from a closed position covering the hatch opening to an open position directly underneath the bridge platform; and removing upward or inserting from above components of the drive train into the nacelle through the hatch opening.

* * * * *

UNITED STATES PATENT AND TRADEMARK OFFICE
CERTIFICATE OF CORRECTION

PATENT NO. : 8,371,820 B2  
APPLICATION NO. : 12/911977  
DATED : February 12, 2013  
INVENTOR(S) : Ingo deBuhr Page 1 of 1

It is certified that error appears in the above-identified patent and that said Letters Patent is hereby corrected as shown below:

Title page, item [73] ASSIGNEE: should read as follows:

AREVA Wind GmbH

Signed and Sealed this  
Twenty-third Day of April, 2013

Teresa Stanek Rea  
*Acting Director of the United States Patent and Trademark Office*